United States Patent [19]

Hazawa

[11] Patent Number: 5,010,475
[45] Date of Patent: Apr. 23, 1991

[54] CONSISTENCY ENSURING SYSTEM FOR THE CONTENTS OF A CACHE MEMORY

[75] Inventor: Osamu Hazawa, Tokyo, Japan

[73] Assignee: NEC Corporation, Tokyo, Japan

[21] Appl. No.: 264,067

[22] Filed: Oct. 28, 1988

Related U.S. Application Data

[63] Continuation-in-part of Ser. No. 934,092, Nov. 24, 1986, abandoned.

[30] Foreign Application Priority Data

Nov. 25, 1985 [JP] Japan .................................. 60-265781

[51] Int. Cl.⁵ ............................................. G06F 15/16
[52] U.S. Cl. ..................... 364/200; 364/228.1; 364/243.41; 364/243.44
[58] Field of Search ............................ 364/200, 900

[56] References Cited

U.S. PATENT DOCUMENTS

| | | | |
|---|---|---|---|
| 3,581,291 | 5/1971 | Iwamoto et al. | 364/200 |
| 4,056,844 | 11/1977 | Izumi | 364/200 |
| 4,142,234 | 2/1979 | Bear et al. | 364/200 |
| 4,385,351 | 5/1983 | Matsuura et al. | 364/200 |
| 4,481,573 | 11/1984 | Fukunaga et al. | 364/200 |
| 4,638,431 | 1/1987 | Nishimura | 364/200 |
| 4,648,030 | 3/1987 | Bomba et al. | 364/200 |
| 4,654,819 | 3/1987 | Stiffler et al. | 364/200 |
| 4,747,043 | 5/1988 | Rodman | 364/200 |
| 4,814,981 | 3/1989 | Rubinfeld | 364/200 |

Primary Examiner—Michael R. Fleming
Assistant Examiner—Debra A. Chun
Attorney, Agent, or Firm—Foley & Lardner, Schwartz, Jeffery, Schwaab, Mack, Blumenthal & Evans

[57] ABSTRACT

A consistency ensuring system has at least one main memory and a plurality of processors each having a corresponding instruction cache memory and operand cache memory. Each of the plurality of processors includes a flush address array device, an address converting device, a signal generating device and a flush address array invalidating device. The flush address array device maintains a copy of an address array to be looked up for invalidating a block of data in the cache memories of the corresponding processor in response to storing a corresponding block of data into the main memory from another processor. The address converting device converts a virtual address to a real address and updates a page table word after address conversion and storage of the updated page table word in the main memory but not in the corresponding cache memories. The signal generating device generates a page table word store notice signal when the address converting device stores the updated page table into the main memory. The flush address array invalidating device invalidates the data of the corresponding block in the cache memories of the corresponding processor in response to the the page table word store notice signal and a real memory address of the page table word from the corresponding process.

4 Claims, 15 Drawing Sheets

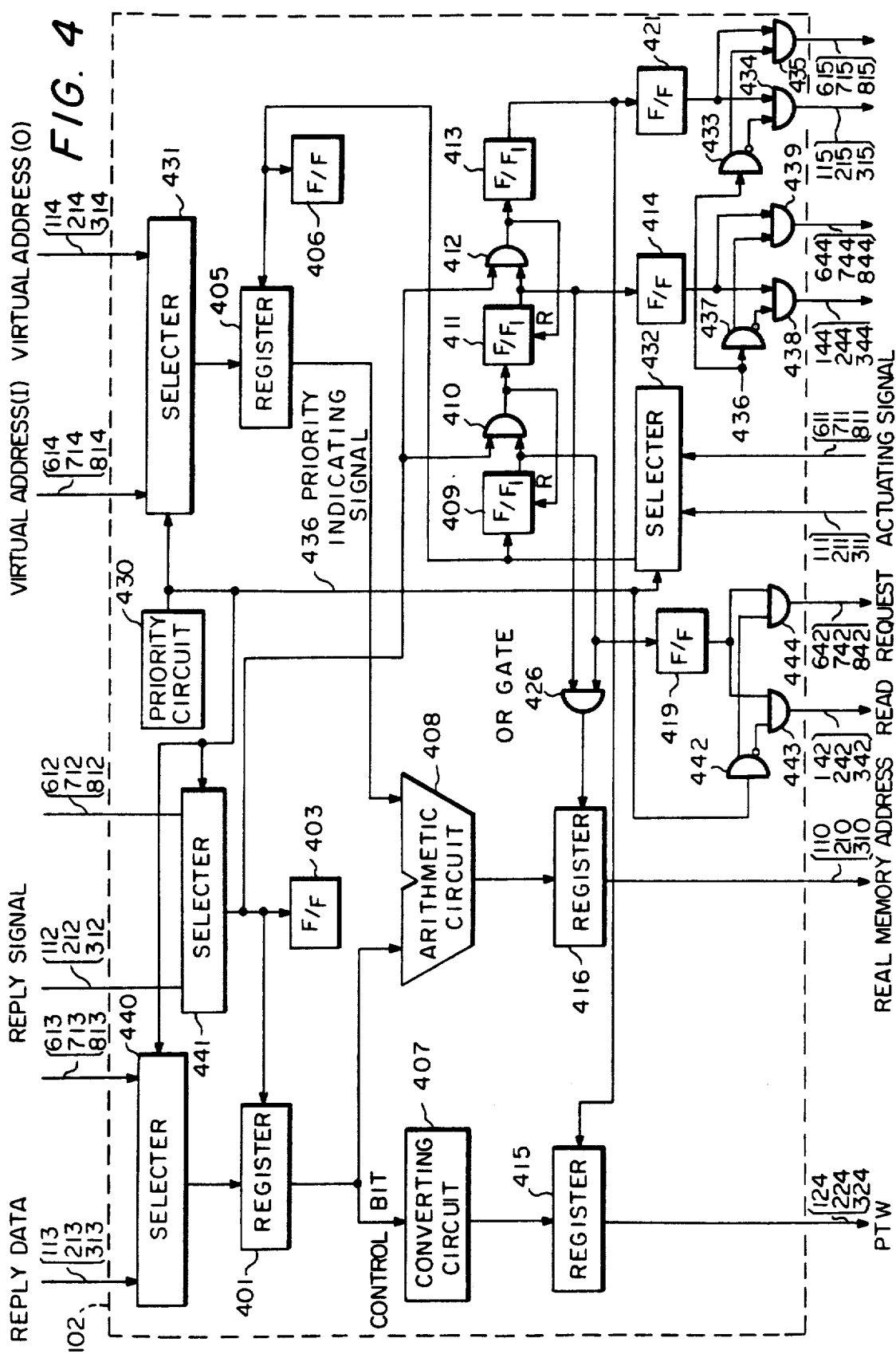

CONSISTENCY ENSURING SYSTEM FOR THE CONTENTS OF A CACHE MEMORY

CROSS REFERENCE TO RELATED APPLICATION

This application is a continuation-in-part of Ser. No. 934,092, filed Nov. 24, 1986, now abandoned and entitled "Consistency Ensuring System for the Contents of a Cache Memory".

BACKGROUND OF THE INVENTION

The present invention relates to a consistency ensuring system for the contents of a cache memory and, more particularly, to a cache consistency achieving system for a processor's own cache memory (CM) when a page table word is renewed and stored not in the CM but only in a main memory (MM).

It is well known that, in order to reduce the frequency of accesses to the MM and thereby increase the processing speed, a high-speed CM is used for storing part of the data stored in the MM.

For details of such a CM, reference is made to the article titled "CACHE MEMORIES" in the Computing Surveys, Vol. 14, No. 3, pp. 474 to 479, September issue, 1982 (hereinafter called Reference).

Since a CM is used as a partial substitute for an MM, the contents of the CM should be identical with the corresponding contents of the MM. Accordingly, whenever data stored in the MM is updated, the corresponding contents of the CM are also updated or invalidated with a view to ensuring consistency between the contents of the CM and the corresponding contents of the MM. A flush address array, which is a copy of the address array of a CM, also processes registration from the CM or invalidation to ensure the consistency.

Consider the case of a multiprocessor system using a virtual addressing technique and having a translation lookaside buffer (TLB). If no real address corresponding to a virtual address is found on the TLB, a page table word (PTW) present on a certain bank in the MM is read out to achieve address conversion. The PTW consists of the real memory address corresponding to a virtual address whose conversion is requested and at least one control bit indicating the state of use of the page table word and so forth. In this case, the control bit contained in the PTW is updated. The purpose of the updating is to keep track of the latest use state of the PTW according to the control bit and thereby to facilitate paging control. Information of such a TLB is disclosed in the Reference, p. 518, Subsection 2.16, and that on address conversion, in the same literature, p. 520, Subsection 2.17.

Since the PTW is updated every time it is read out as referred to above, it has to be rewritten into the MM. No access to the bank on which the pertinent PTW is present in the MM should be allowed to any other processor during the process of such address conversion. When the PTW is stored in the MM, consistency between the contents of the MM and the corresponding contents of the CM has to be ensured, and for this purpose, the PTW has to be entered into a buffer unit before it is stored in this CM. The output of the buffer unit is used for storing in the CM. The buffer unit consists of two buffers, one each for addresses (address array) and for data. The address is promptly determined by the TLB. However, since the data comes from an execution unit, it is often determined later than the address. Since the storing sequence should be observed, unless both address and data are ready, they are not discharged into the CM. For these reasons, if the PTW enters the store buffer, a considerable length of time is likely to lapse before it is discharged from the store buffer. No other processor is allowed access to the bank on which the PTW is present until its storing is completed. Hence the longer this period, the poorer the performance of the system.

In a conventional system, in order to prevent performance deterioration by such causes, an updated PTW is stored directly into the MM instead of being stored via the CM, and the prohibition period of access to the MM by other processors is thereby shortened.

Storing into the MM in this case involves accessing through a system control section positioned between a plurality of central processor units (CPU's) and the MM. The system control section gives a command, concerning a storing done by one CPU, only to CPU's other than the CPU that has done the storing, to ensure consistency thereby eliminating any inconsistency that may arise between the MM and a CM. As a result, even though a PTW is stored, the CPU that has done the storing does not receive a request to ensure consistency. Hence, it cannot ensure consistency, resulting in an inconsistency between its CM and the MM as far as that PTW is concerned.

Differently from the above-mentioned embodiment, when the instruction is stored in the instruction cache memory and the main memory in the system having an operand cache memory and an instruction cache memory separately, the instruction cannot be stored in the operand cache memory. Also, in the case of the storage of the operand into the operand cache memory and the main memory, the operand cannot be stored in the instruction cache memory. Although an instruction PTW itself is a kind of operand, it is stored in the cache memory and the main memory together with the above-mentioned instruction. As a result, when software needs the instruction PTW, it must access the main memory, because the software recognizes the instruction PTW as an operand.

The need for cache consistency ensuring is disclosed in the Reference, p. 501, "2. Cache Consistency", as well as an example of a method to ensure cache consistency, in the same paper, p. 505, "2. Broadcast Writes".

As described above, in the conventional system, cache consistency is not ensured for the processor that had done address conversion in storing a PTW. As a result, an inconsistency in contents may arise between the MM and CM in storing a PTW. Accordingly, there is the disadvantage that, even when the software simply refers to a PTW to rewrite a page, the CM cannot be used, rather the MM with a longer access time has to be used, entailing a corresponding deterioration in performance.

SUMMARY OF THE INVENTION

One object of the present invention is, therefore, to provide a cache consistency ensuring system free from the above-mentioned disadvantage, wherein accesses to the address array are reduced to achieve a higher performance for the CM system.

According to one aspect of the present invention, a consistency ensuring system for the contents of a CM is provided. The system has an MM and a plurality of processors each having a cache memory. Each of the plurality of processors comprises an operand flush address array and an instruction flush address array for keeping a copy of the address array to be looked up to invalidate, in response to storing into its own MM from another processor, the data of the corresponding block in its own CM. Each processor also comprises an address converting section for updating a PTW after address conversion and storing the updated PTW not in said CM but only in said MM. Each processor also comprises signal generating means for generating a notice signal for giving a notice, whenever the updated PTW is to be stored into the MM, of such storing. Finally each processor comprises flush address array invalidating means for looking up and invalidating operand and instruction, in response to the supply of the storing notice signal and the real memory address of the PTW from its own processor, the data of the corresponding block in the CM of its own processor in order to invalidate the data of such corresponding block.

BRIEF DESCRIPTION OF THE DRAWINGS

FIG. 4 is a diagram of a detailed structure of an address converting section 102 of the embodiments of FIGS. 1 and 2;

In the drawings, the same reference numerals denote the same structural elements. The cache control unit and the flush address array are shown for operand and instruction, smaller numbers indicating operand, and greater numbers indicating instruction.

DETAILED DESCRIPTION OF PREFERRED EMBODIMENTS

Figure 1:
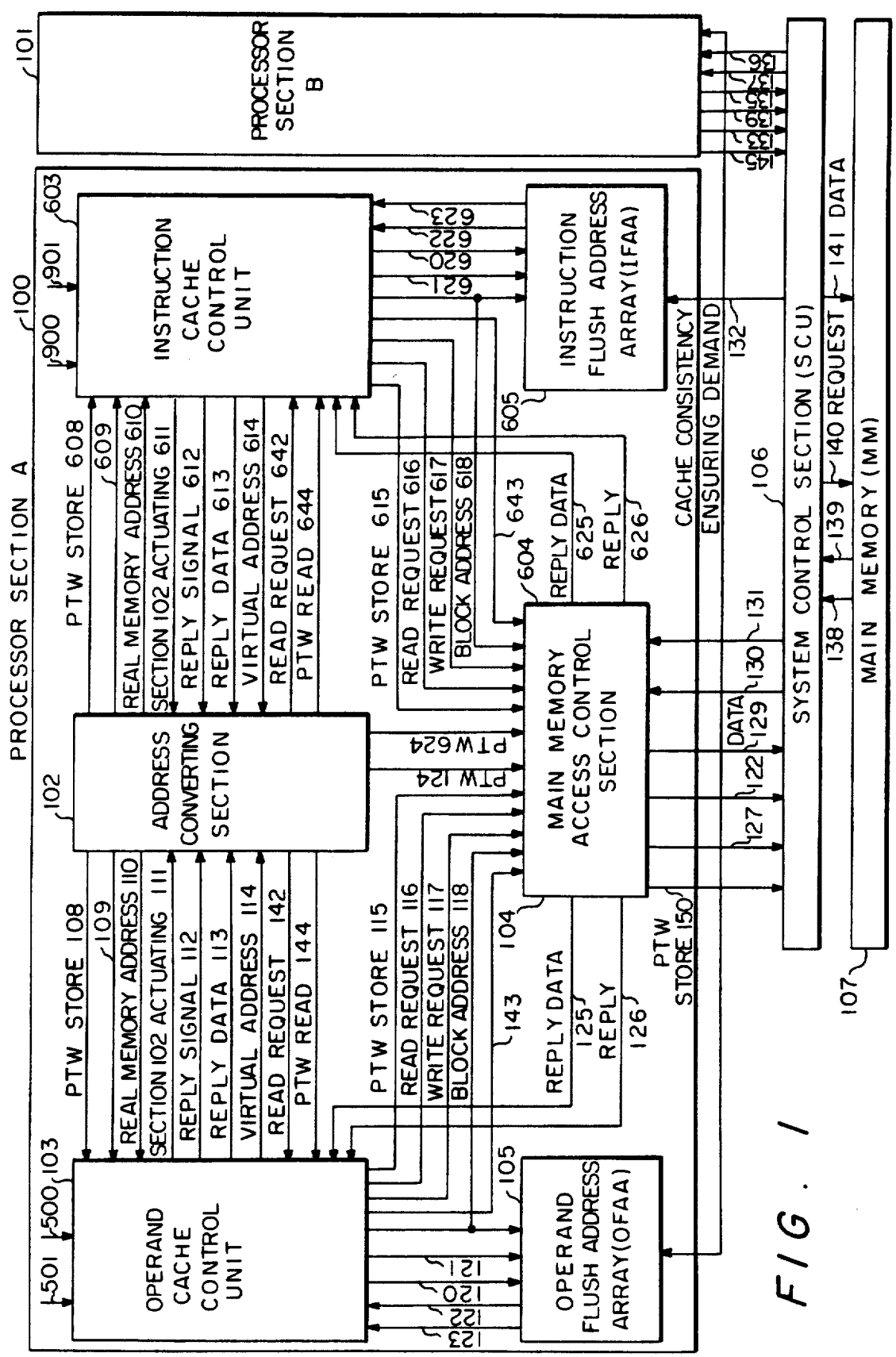
FIG. 1 is a diagram of a first preferred embodiment of the invention.

Referring to FIG. 1, a first embodiment of the invention comprises processor sections 100 and 101, a system control section (SCU) 106 for controlling the interactions among the processor sections 100 and 101, and a main memory (MM) 107 commonly used by the processor sections 100 and 101. Each of the processor sections 100 and 101 further comprises an address converting (AC) section 102 for converting virtual addresses into real memory addresses, an MM accesses control section 104 for controlling access to the MM 107, a cache control unit (CCU) 103 for controlling a cache memory (CM), and a flush address array (FAA) 105 including a flush address memory, which is a copy of the address array of the CM.

Figure 5A:
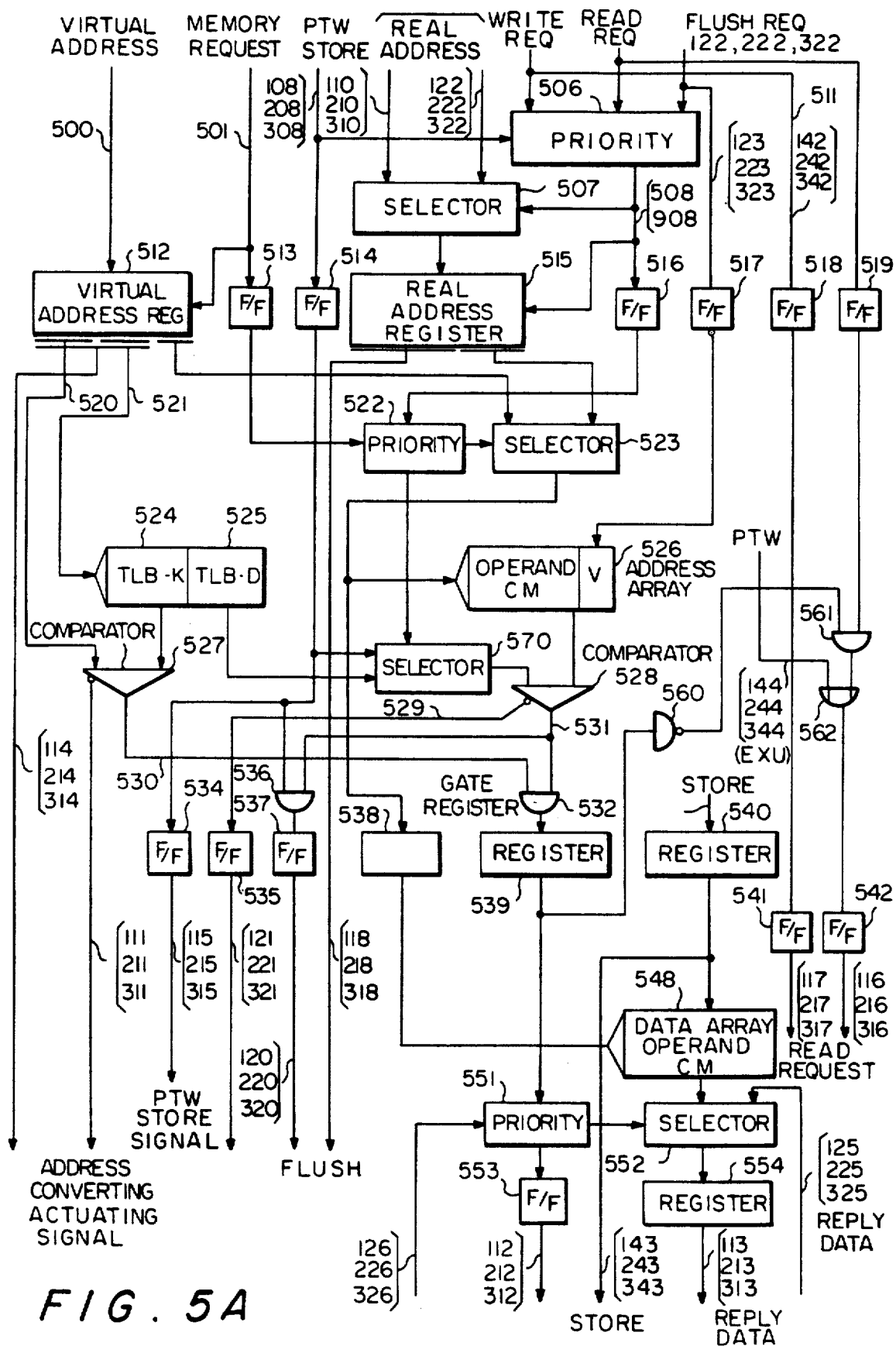
FIG. 5A is an operand diagram of a detailed structure of a cache control section 103 of the embodiments of FIGS. 1 and 2.

Referring to FIGS. 1 and 5A, in response to a virtual address 500 and a memory request 501 from an external source the CCU 103 looks up in a translation lookaside buffer (TLB) and, if no real address corresponding to the externally given virtual address is found, the converting section 102 is actuated by an AC section-actuating signal 111. Thus, the virtual address 500 is stored into a virtual address register 512. Part of the virtual address, 521, stored in the register 512 accesses the TLB 524 and 525. With this access, the TLB's key section 524 outputs a key, which is compared with the rest 520 of the virtual address stored in the register 512 by a comparator 527.

Meanwhile, the request signal 501, after being stored into a flipflip (F/F) 513, is supplied to a priority circuit 522, whose output is fed to a selector 523 to give an instruction to select the rest of the virtual address in the register 512. The rest of the virtual address selected by the selector 523, in response to the instruction, is supplied to an address array 526. In response to the remaining part of the virtual address, data is output from the address array 526. The data is compared with data from the TLB's data section 525 by a comparator 528. The logical product of a consistency signal resulting from the comparison operation and another consistency signal from the circuit 527 is taken by a gate 532. When the virtual address (externally given) is in the TLB 524 and 525, the output of a gate 532 is fed to a priority circuit 551 by way of a register 539. The priority circuit 551 then gives an instruction to a selector 552 to select data from a data array 548. With this instruction, data from the array 548 is stored into a register 554 via the selector 552, and returned to the exterior as a reply data 113.

If the externally given virtual address is not stored in the TLB's key section 524, the comparator 527 supplies the actuating signal 111 to the section 102.

Referring now to FIGS. 1 and 4, the AC section 102 actuates a sequence circuit, in response to the signal 111, refers to a page table in the memory, takes out a page table word (PTW), and generates a real memory address in the PTW. The actuating signal and a virtual address 114 are selected by the selectors 432 and 431, in response to a priority signal 436 from a priority circuit 430. Thus, in the section 102, an F/F 409 of the sequence circuit is set by a virtual address 114 from the CCU 103. At the same time, the virtual address 114 is fed to an arithmetic circuit 408 via a register 405, and a real memory address is generated and stored into a register 416. The output of the F/F 409 sets an F/F 419, whose output is supplied as a read request signal 142 to the CCU 103. In response to the value "1" from a priority circuit 430, the AND gate 444 generates a read request signal 642. Along with that, the output of the F/F 409 is fed to the register 416 via an OR circuit 426, and the register 416 outputs a real memory address 110, which is supplied to the CCU 103. In response to the read request 142 and real memory address 110, the CCU 103 reads data out of the CM or MM 107, and sets them as the reply data 113 in a register 401 of the section 102. Together with the reply data 113, a reply signal 112 is supplied to the section 102 to set an F/F 403 and, at the same time, to reset the F/F 409 via an AND gate 410. In response to the value "1" from the priority circuit 430, a selector 440 selects a reply data 613, and a selector 441 selects a reply signal 612. Simultaneously with the resetting, an F/F 411 is set. With the setting, the result of arithmetic processing of reply data from the register 401 and the contents of the register 405 by the arithmetic circuit 408, i.e., a set instruction signal for setting a PTW address in the register 416, is supplied from the F/F 411 to the register 416 via the OR gate 426. The output of the F/F 411 sets an F/F 414, and the output, as PTW read signal 144, and the PTW real memory address 110 from the register 416 are fed via the CCU 103 to the control section 104 as a read request 116 and a block address 118, which are given to the SCU 106. Since the output 436 of the priority circuit 430 shows the value "0", the output of the F/F 414 becomes the value "1" by an AND gate 438. The SCU 106 performs exclusive control of PTW addresses and read request from the processor section 100 and the other processor section 101, and supplies both the PTW addresses and read requests to the MM 107. PTW's read from the MM (in response to the PTW addresses and read requests) are stored as the reply data 113 into the register 401 via the SCU 106 and the CCU 103. The reply signal 112, given together with the data 113, sets an F/F 413 via an AND gate 412, and, at the same time, resets the F/F 411. A PTW from the register 401 is converted by a control bit converting circuit 407 and, in response to an output signal from the F/F 413, stored into a register 415. The output signal of the F/F 413 is made a PTW store signal 108 via an F/F 421 and, together with a PTW 124 of the register 415, supplied to the FAA 105 via the CCU 103.

Referring again to FIGS. 1 and 5A, the page table is looked up in the following manner.

The read request signal 142 from the AC section 102 is selected by a priority circuit 506 as instructed by the PTW store signal 108. By a selected signal 508 given from the circuit 506, a selector 507 selects the real memory address 110 from the section 102, and stores it into a real address register 515. The selected signal 508 sets an F/F 516, whose output is fed to a priority circuit 522. The instruction given from the circuit 522 makes a selector 523 select one part of the output of the register 515, and supplies it to the address array 526. The output of the circuit 522 allows a selector 570 to select the other part of the output of the register 515. The selected address and data from the array 526 are compared by the comparator 528. If consistency is recognized here, the contents of the data array 548, i.e., of the CM, are returned to the section 102 as the reply data 113. If consistency fails to be recognized by the comparator 528, the output of a register 539 is set in an F/F 542 via an AND gate 561 and an OR gate 562, because an F/F 519 is set by the read request 142 from the AC section 102. The output of the F/F 542 is fed as the read request 116 to the MM 107 via the access control section 104 and the SCU 106. Data from the MM 107 is returned as reply data 125 and 113 to the section 102 via the SCU 106, the section 104 and the CCU 103. Since the output of the priority circuit 164 shows the value "0", the output of the F/F 159 is generated as a REPLY 126 through the gate 166.

In reading a PTW, the cache memory is bypassed. Thus, the read address is set in the real address register 515, but the MM 107 is accessed without looking up the address array 526, i.e. the CM. A PTW read 144 from the section 102 is set in the F/F 542 via the OR gate 562 of the CCU 103, and supplied as the read request 116 to the SCU 106 via the MM access control section 104. Since exclusive control is performed in the SCU 106, no PTW read from the other processor section 101 is accepted until the PTW read undergoes PTW store.

From the PTW store signal 108 from the AC section 102, the CCU 103 sends a PTW store signal 115 to the MM access control section 104 and the FAA 105. The PTW 124 from the section 102 is directly sent to the section 104 without going through the CCU 103. The address is sent as the block address 118 to the section 104 from the real address register 515, in which the address at the time of the PTW reading is stored. If the PTW were to be stored in a register 540, which is the store buffer of the CCU 103, processing would take a long time when the register 540 was full. Then, the other processor section 101, awaiting PTW access under exclusive control by the SCU 106, would be unable to achieve memory access all that time, resulting in a considerable deterioration in system performance. This embodiment of the invention prevents the deterioration of system performance.

Figure 6A:
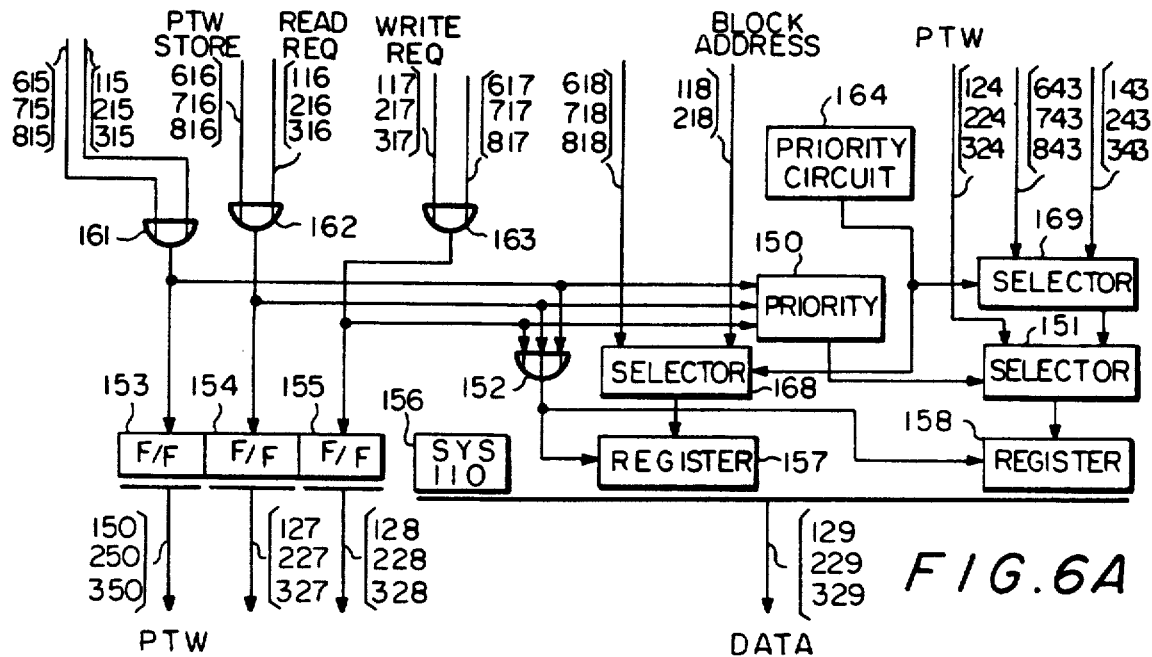
FIGS. 6A and 6B are diagrams of a detailed structure of the MM access control section 104 and 304 of the embodiments of FIGS. 1 and 2.
Figure 6B:
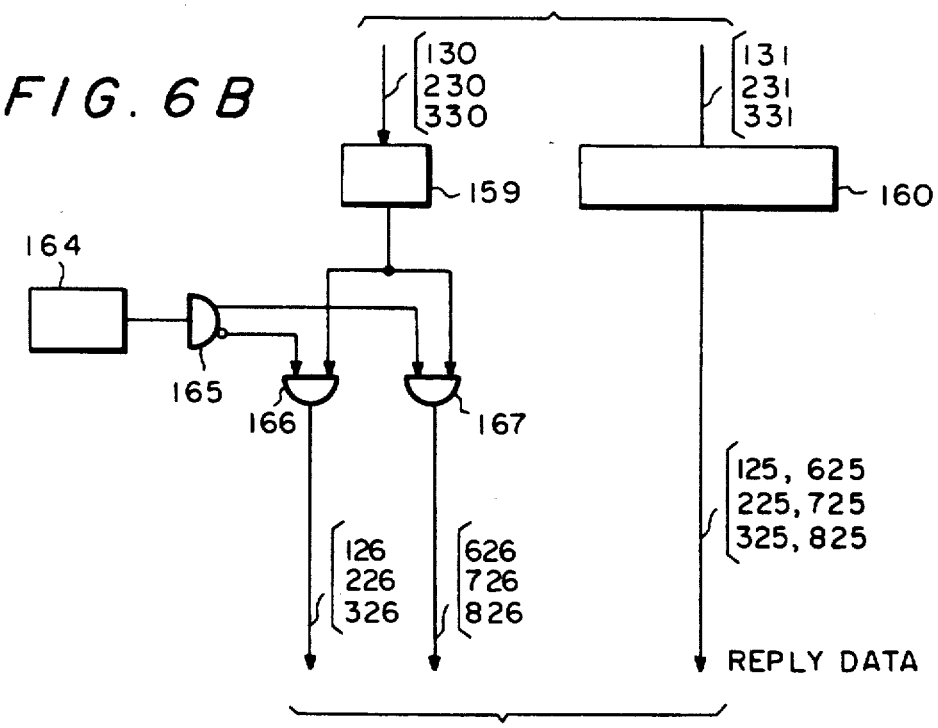

Referring now to FIGS. 1 and 6A, the MM access control section 104 sets the PTW store signal in an F/F 153, and stores the block address 118 into a register 157. By the PTW store signal 115, a priority circuit 150a outputs an instruction signal, in response to which a selector 151 selects a PTW 124, which is stored into a register 158. The selector 151 selects one of the outputs of the PTW 124 and the selector 169. In response to the selection designating signal from the priority circuit 164, the selector 169 selects one of the store data 143 from the operand cache and the store data 643 from the instruction cache. The priority circuit 164 can show the priority of the operand storing operation and the instruction storing operation. After that, the section 104 sends the SCU 106 data 129, consisting of its own system number 156, address 157 and data 158, and a PTW store signal 150.

Figure 7A:
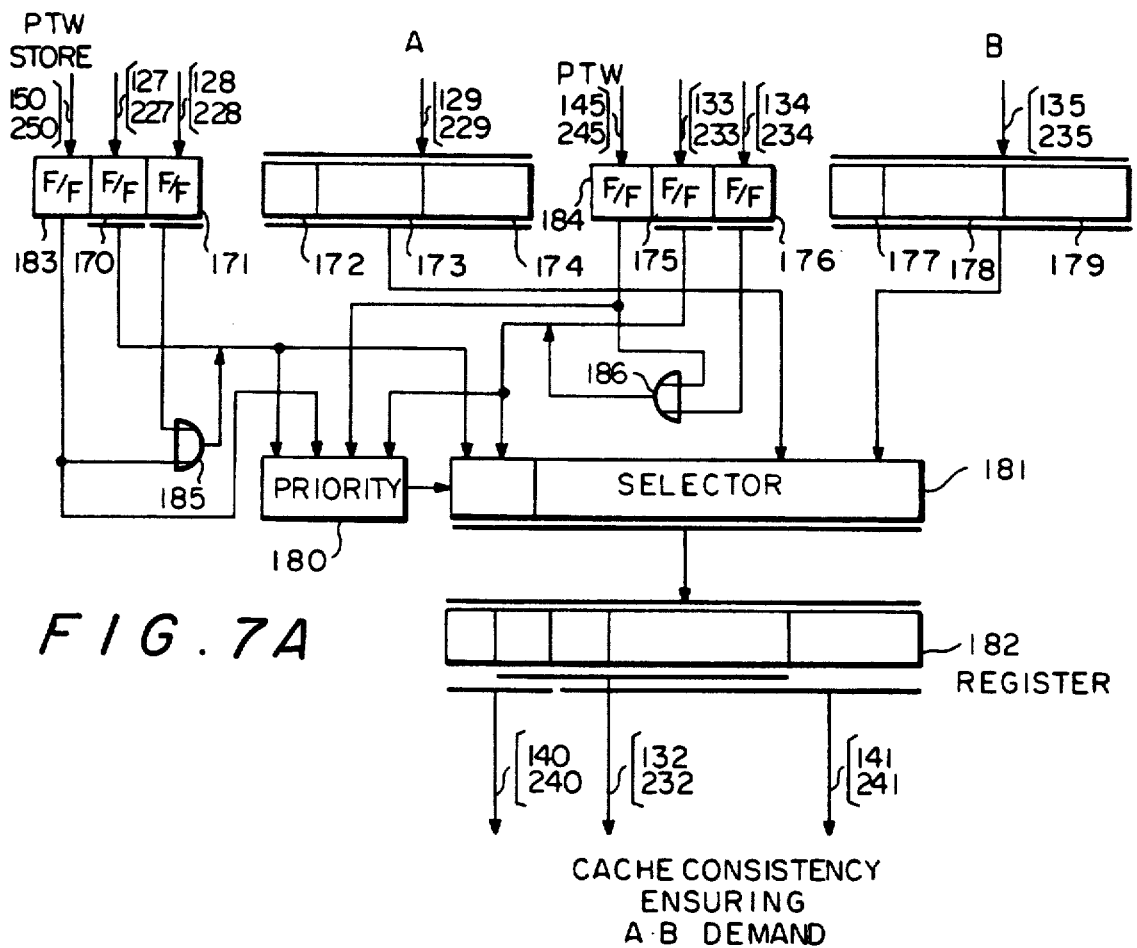
FIGS. 7A and 7B are diagrams of a detailed structure of the system control section of the embodiments of FIGS. 1 and 2.
Figure 7B:
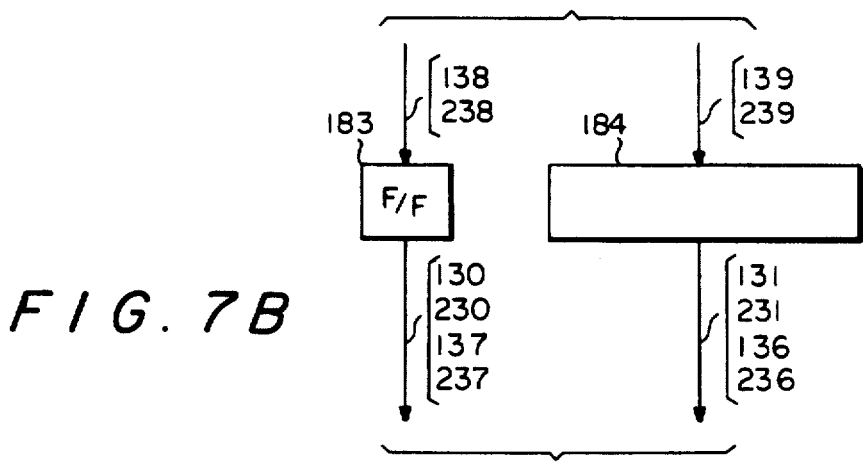

Referring to FIGS. 1, 7A and 7B, in the SCU 106, the PTW store signal 150 from the MM access control section 104 is set in an F/F 183 and, out of the data 129, the system number, address and data are stored into registers 172, 173 and 174, respectively. The output of the F/F 183 is fed to a selector 181 via an OR gate 185, and at the same time to a priority circuit 180, which recognizes the PTW store signal, cancels the exclusive conditions of the PTW reading which took place before the PTW storing, and receives a PTW read signal after the PTW storing. Then a read request, write request, system number, address and data are stored into a register 182, whose output is sent to the MM 107 to complete the PTW storing.

Next will be described in detail the operation of the FAA 105.

Referring to FIGS. 1 and 5A, F/F's 514 and 534 of the CCU 108 are set by the PTW store signal 108 from the AC section 102. The output of the F/F 534 is supplied as the PTW store signal 115 to the MM access control section 104 and the FAA 105. The block address 118 is also supplied from the CCU 103 to the FAA 105.

Figure 10A:
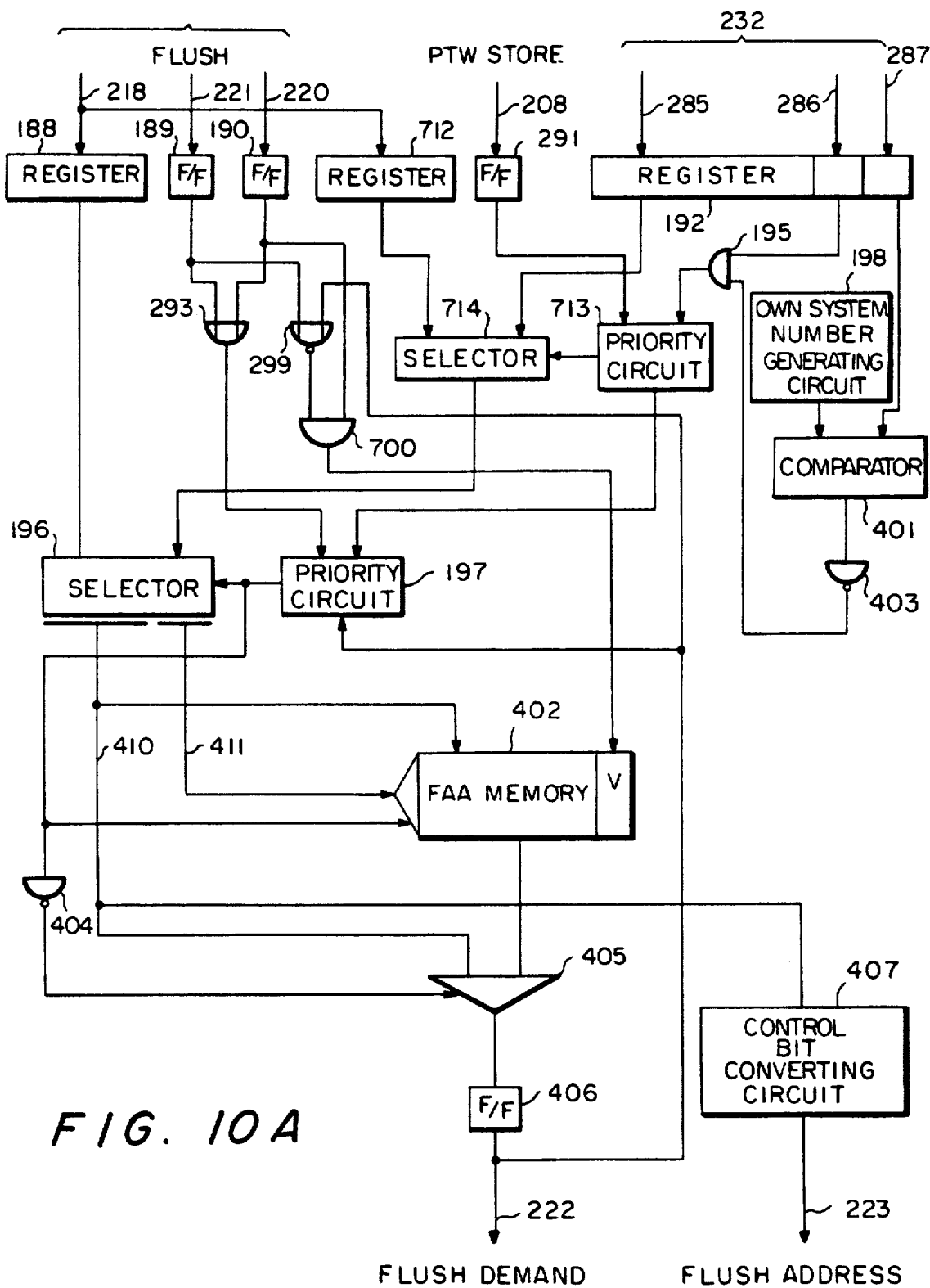
FIG. 10A is a diagram of a detailed structure of the operand FAA 205 of the embodiment of FIG. 2.
Figure 10B:
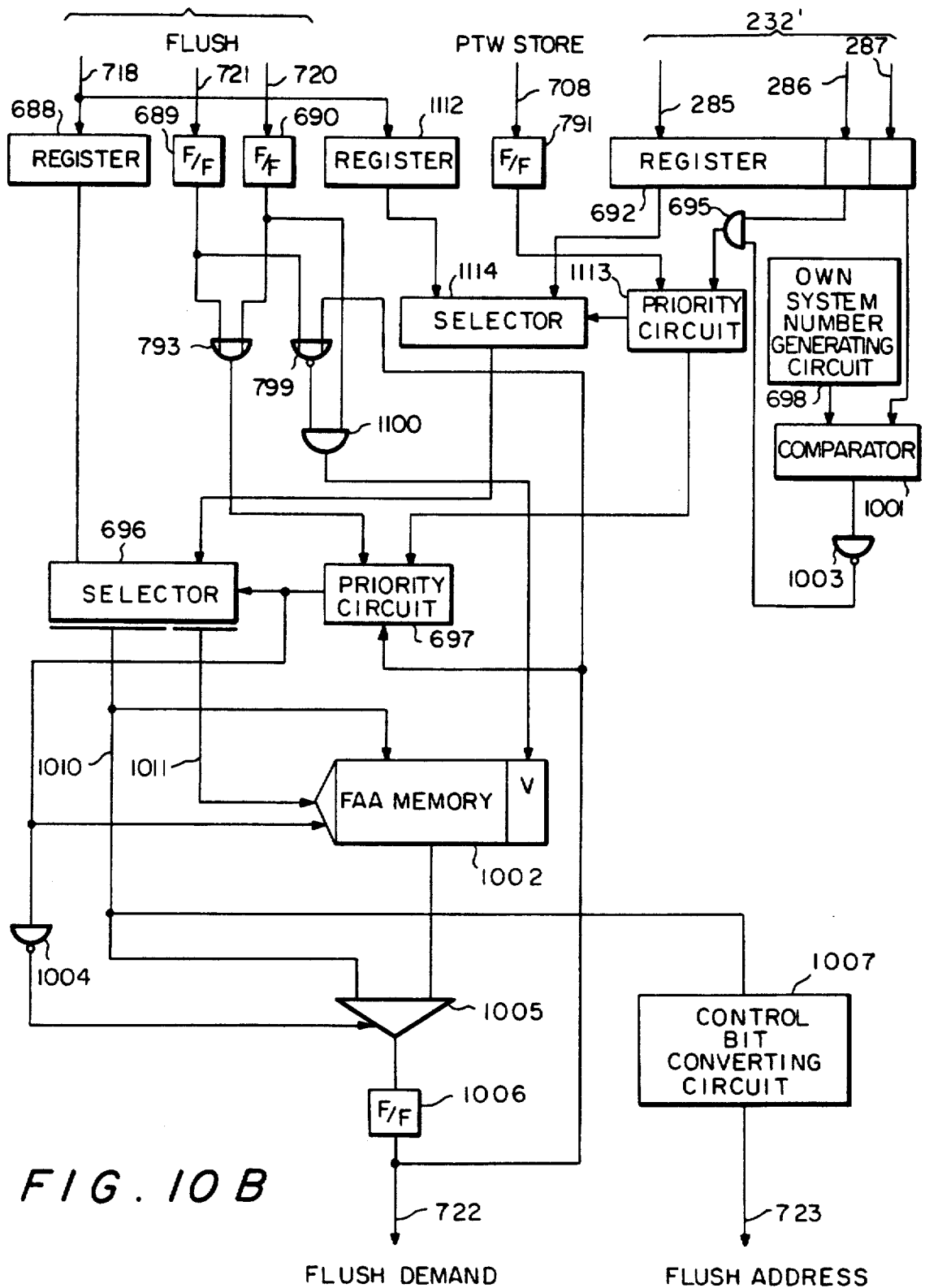
FIG. 10B is a diagram of a detailed structure of the instruction FAA 205 of the embodiment of FIG. 2.

Referring now to FIGS. 1, 10A and 10B, the PTW store signal 115 is set in an F/F 191, whose output is fed to a priority circuit 197 via an OR gate 194. With an instruction from the circuit 197, the selector 196 selects the output of a register 188. The circuit 197, in response to the output of the F/F 191, does not supply an enable signal to an FAA memory 402, and instead activates a comparator 405 via a NAND gate 404. An address is output from the FAA 402 in response to an in-block address 411 of the register 188, selected by the selector 196. This address and a block address 410 from the register 188 are compared by the comparator 405. If consistency is confirmed, an F/F 406 is set. The output of the F/F 406, as flush demand signal 122, is sent together with a flush address 123 to the CCU 103.

Referring once again to FIGS. 1 and 5A, the signal 122 from the FAA 105 is set in an F/F 517. The negative output of the F/F 517 varies the V bit of the corresponding block in the address array 526.

Figure 9A:
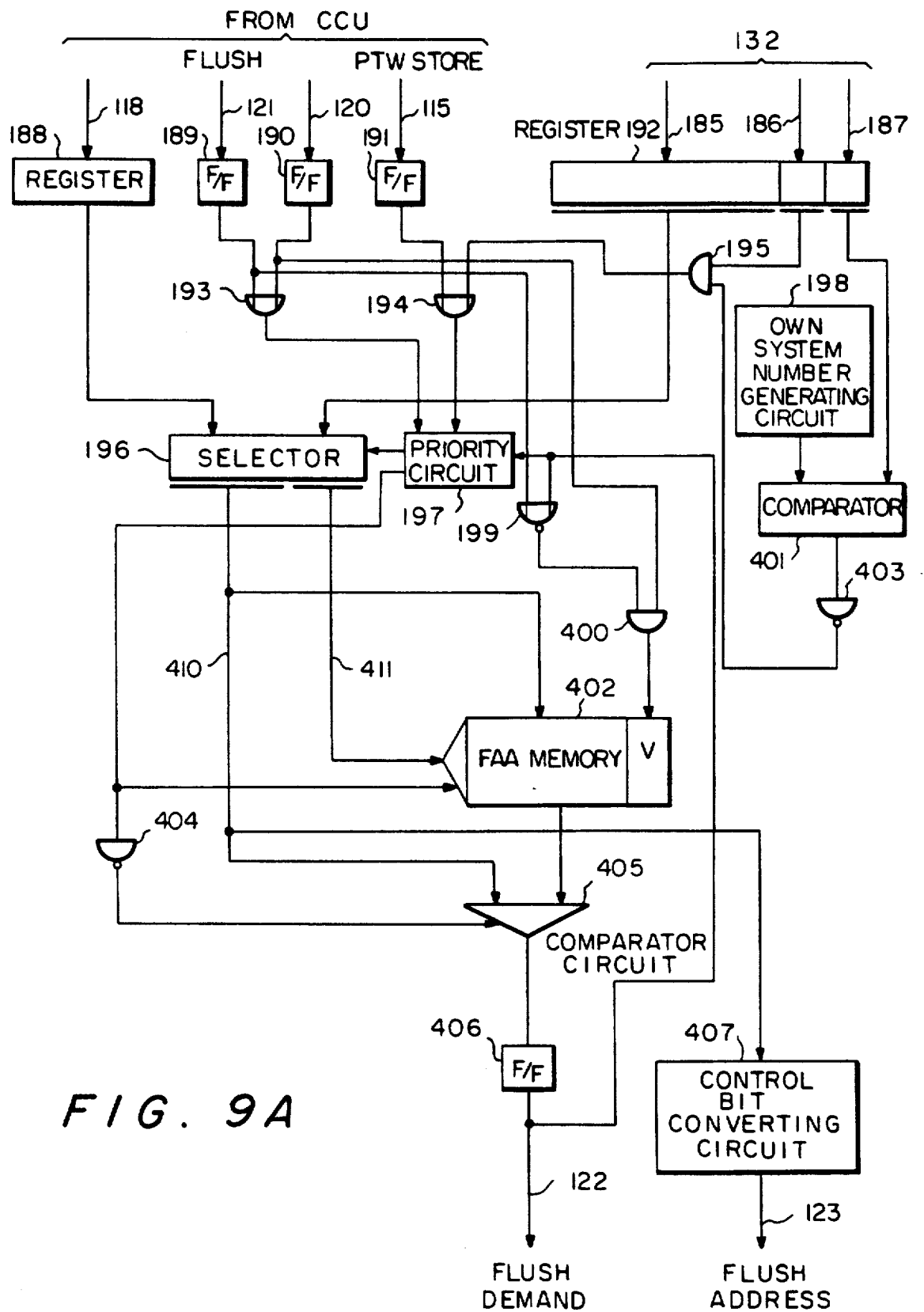
FIG. 9A is a diagram of a detailed structure of the flush, address array (FAA) 105 of the embodiment of FIG. 1.

Referring back to FIGS. 1, 9A and 9B, the output of the F/F 406, i.e. the signal 122, is supplied to the FAA memory 402 via a NOR gate 198 and an AND gate 400, and varies the V bit of the corresponding block.

The flushing operation will be described in detail below. In response to the flush demand signal 122, the priority circuit 197 suspends processing of other requests, and enters a cycle to vary the V bit of the FAA 402. The circuit 197 gives an instruction to the selector 196 to select the contents of the register 188 in which is stored the address which was stored in the FAA 402 and could be read out in the preceding cycle. Along with that, the circuit 197 supplies a write-enable signal to the FAA 402, and also sends a comparison-not-allowed signal to the comparator 405 via the NAND gate 404. In this state, the flush demand signal 122 is supplied to the FAA 402 via a NOR gate 199 and the AND gate 400 to vary the V bit. This completes the "flushing" operation.

In the first embodiment of the invention, the PTW store signal 108 from the AC section 102 is supplied to the FAA 105 via the CCU 103, so that the PTW storing operation can be reflected on the CM.

Next will be described in detail a second embodiment of the invention.

Figure 2:
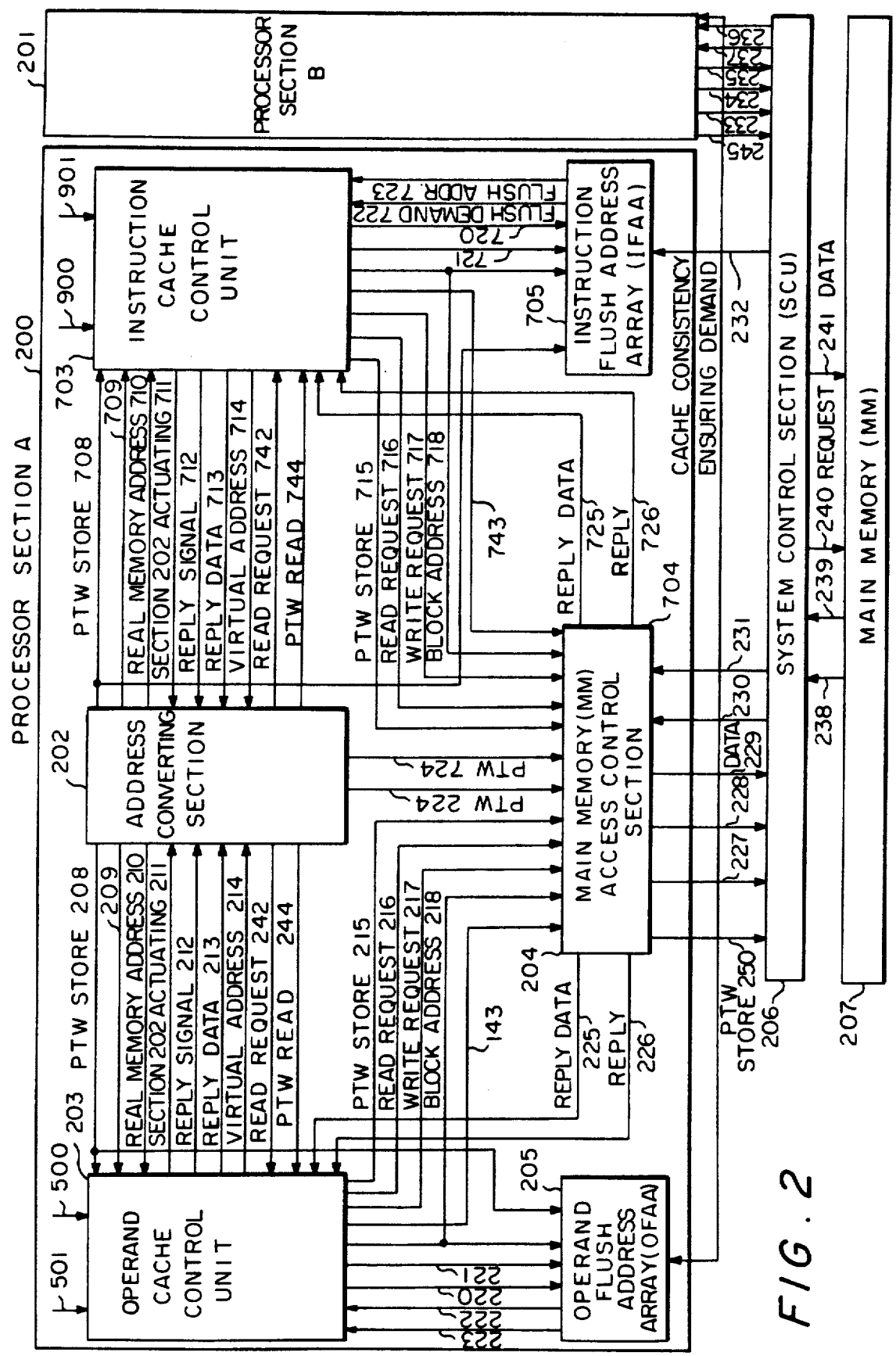
FIG. 2 is a diagram of a second embodiment of the invention.

Referring to FIGS. 1 and 2, the second embodiment of the invention is substantially the same as the first in structure and operation. The only difference is that, while in the first embodiment the PTW store signal 108 from the AC section 102 is supplied to the FAA 105 via the CCU 103, in the second embodiment a PTW store signal 208 from an AC section 202 is directly fed to an FAA memory 205.

Referring to FIG. 10A, the signal 208 from the section 202 is fed to a priority circuit 713 via an F/F 291. In the priority circuit 713, in response to the output of the F/F 291, a selector 714 receives an instruction from the circuit 713 to select an output of a register 712. The outout of the circuit 713 enables a priority circuit 197 to give an instruction to a selector 196 to select an output from the selector 714. The output of the circuit 197 gives an instruction to forbid writing into an FAA memory 402, and another to a comparator 405 to compare the output of the FAA 402 with that of the selector 196. If the result of the comparison by the comparator 405 indicates consistency, F/F 406 is set. The output of the F/F 406, as a flush demand signal 222, is sent together with a flush address 223 to a CCU 203. The output of the F/F 406 is supplied to the FAA 402 via a NOR gate 299 and an AND gate 700 to vary the V bit.

Next, a third embodiment of the invention will be described in detail.

Referring to FIGS. and 3, the third embodiment of the invention is substantially the same as the first in structure and operation, except that, while in the first embodiment the PTW store signal 108 from the AC section 102 is supplied to the FAA 105 via the CCU 103, in the third embodiment a PTW store signal 308 from an AC section 302 is directly fed to an FAA 305 via a CCU 303, an MM access control section 304 and an SCU 306.

In the third embodiment, the operation is similar to that in the first embodiment until the signal 308 is supplied as a PTW store signal 350 to the SCU 306 via the CCU 303 and the section 304.

Figure 3:
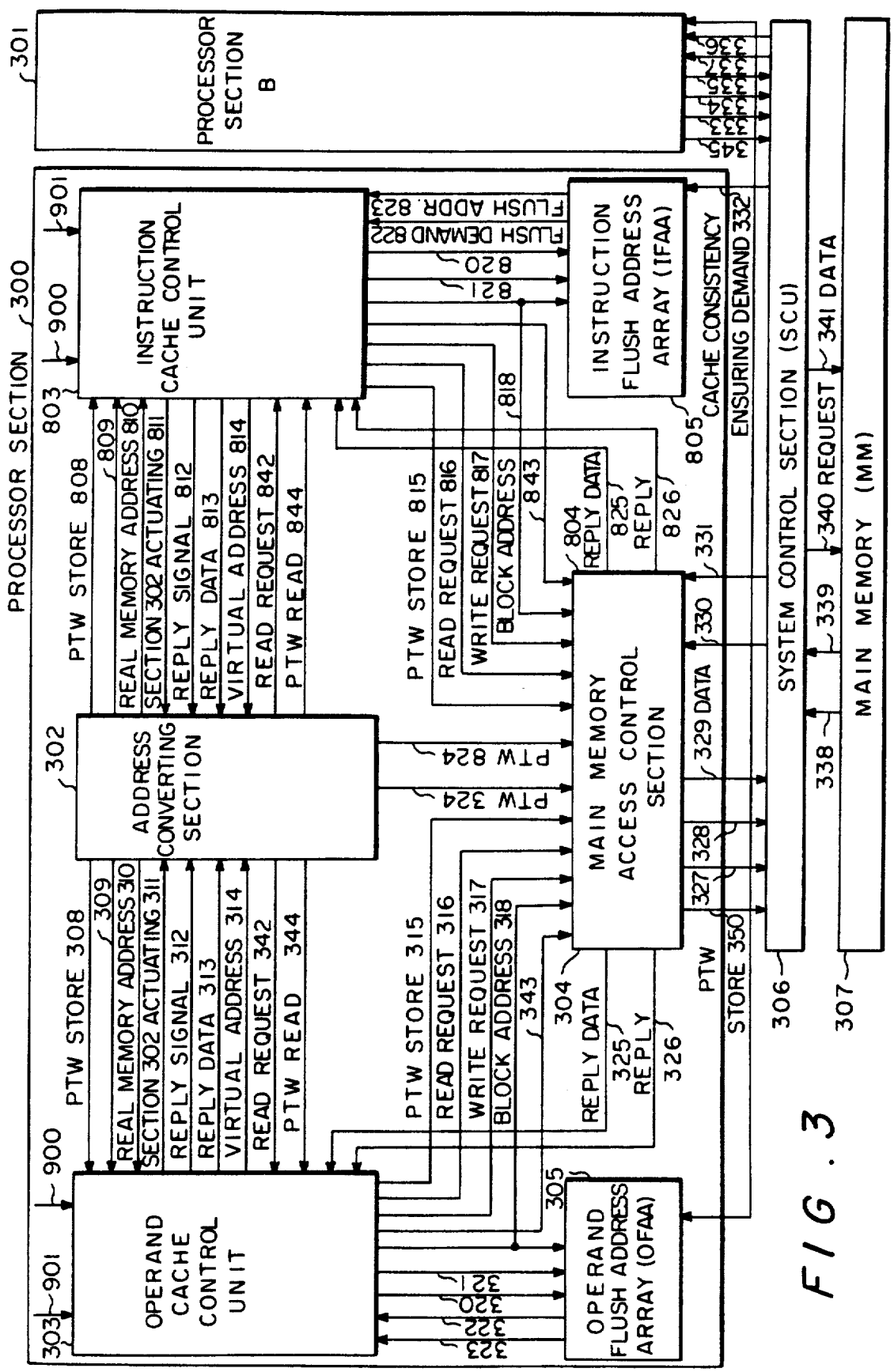
FIG. 3 is a diagram of a third embodiment of the invention.
Figure 8A:
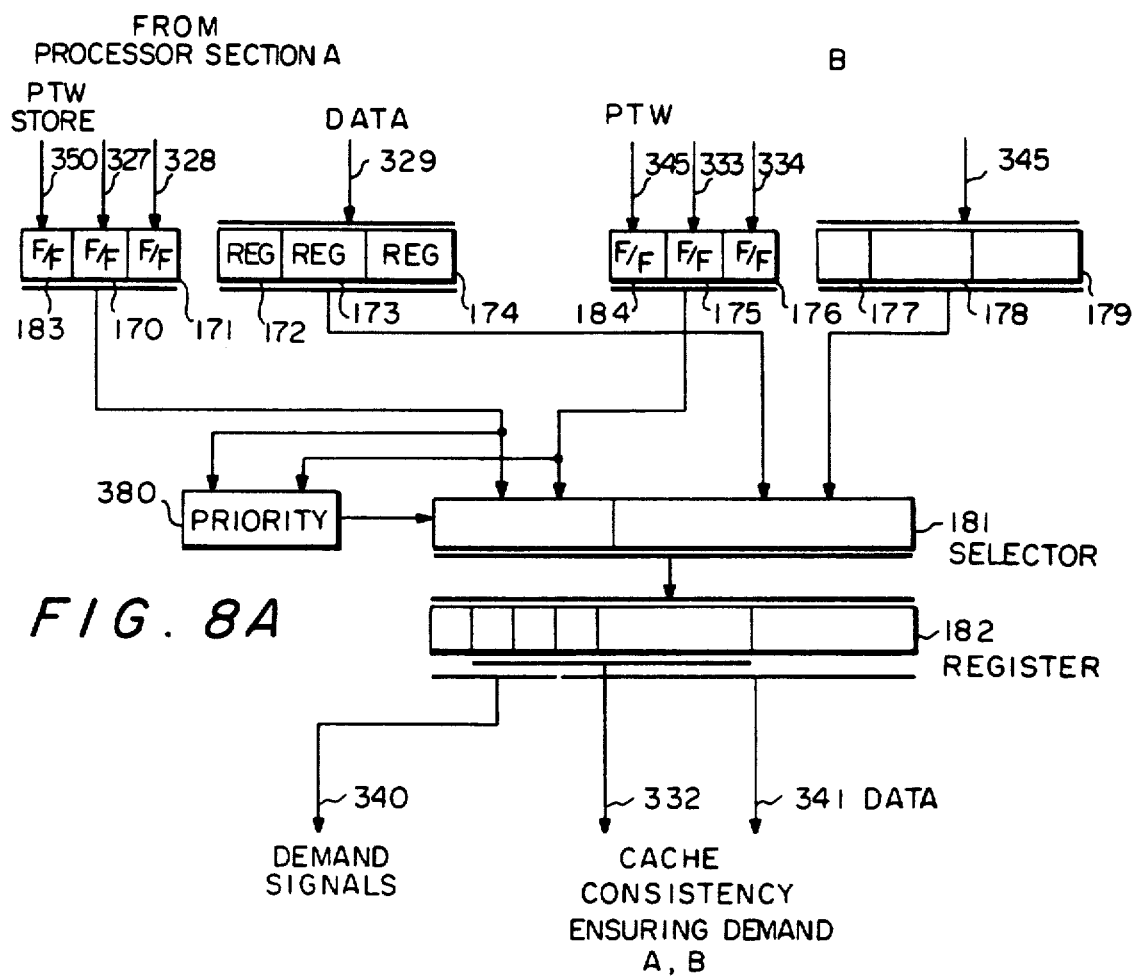
FIGS. 8A and 8B are diagrams of a detailed structure of the system control section of the embodiment of FIG. 3.

Referring now to FIG. 8A, the PTW store signal 350 from the section 304 is supplied via an F/F 183 to a priority circuit 380, which gives an instruction to a selector 181 to select data 329 from a processor section A 300, stored in registers 172, 173 and 174. As a result, the output of the register 172, which is a system number from the processor A 300; that of the register 173, which is a block address; that of the register 174, which is a datum (PTW); that of the PTW store F/F 183; that of a read F/F 170; and that of a write F/F 171, are stored in a register 182. Register 182 outputs the PTW store signal, read request signal, write request signal, all as request signals 340. Also, the system number, block address and datum (PTW), all as data 341, are sent to an MM 307. Further among the outputs of the register 182, the PTW store signal, write request signal, system number and block address are sent as cache consistency ensuring demand signals 332 to all the processors (300 and 301 in FIG. 3).

Figure 11A:
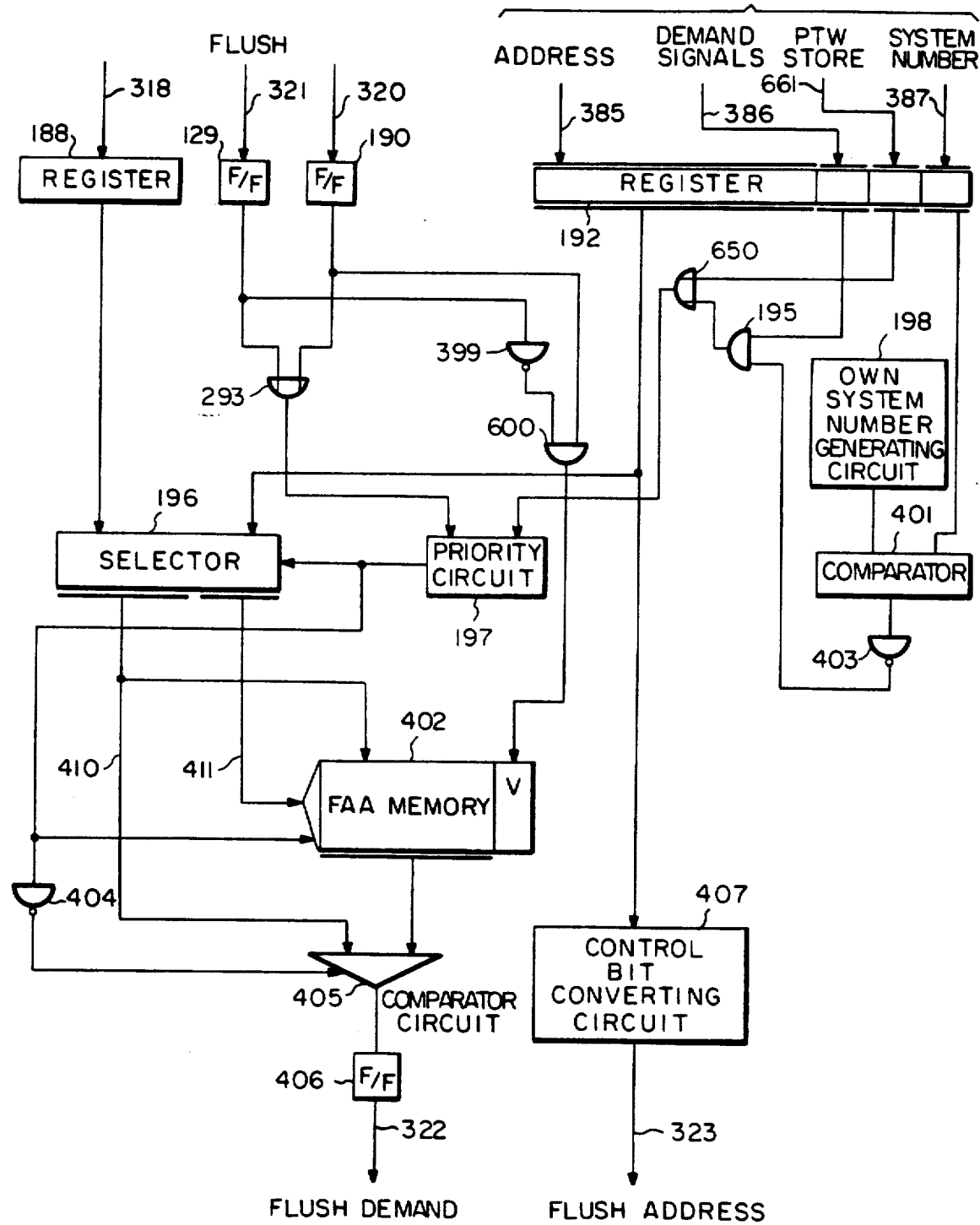
FIG. 11A is a diagram of a detailed structure of the operand FAA 305 of the embodiment of FIG. 3.

Referring to FIG. 11A, the items of information sent from the SCU 306 as cache consistent ensuring demand signals 332, i.e. an address 385, a cache consistent ensuring demand 386, a PTW store 661 and a system number 387, are stored in a register 192. Consistency between the system number 387, stored in the register 192, and the number generated from an own system number generating circuit 198 is confirmed by a comparator 401. A signal is supplied to a priority circuit 197 via an OR gate 650 if the PTW store signal 661 is "1" even though the output of an AND gate 195 is "0". By the output of the OR gate 650, a selector 196 gives an instruction to a priority circuit 197 to select the address 385 from the register 192. The output of the circuit 197 gives a write forbid instruction to an FAA memory 402, and at the same time is supplied via a NAND gate 404 to a comparator 405, which compares the address 385 supplied from the selector 196 and an address from the FAA 402. The consistency confirmed by the comparison is set in an F/F 406 and, together with a flush address 323, is transferred to the CCU 303 as a flush demand signal 322. Next, the operation of the invention comprising the instruction cache control section 103 and the instruction flush address array 105 will be described in detail.

Figure 5B:
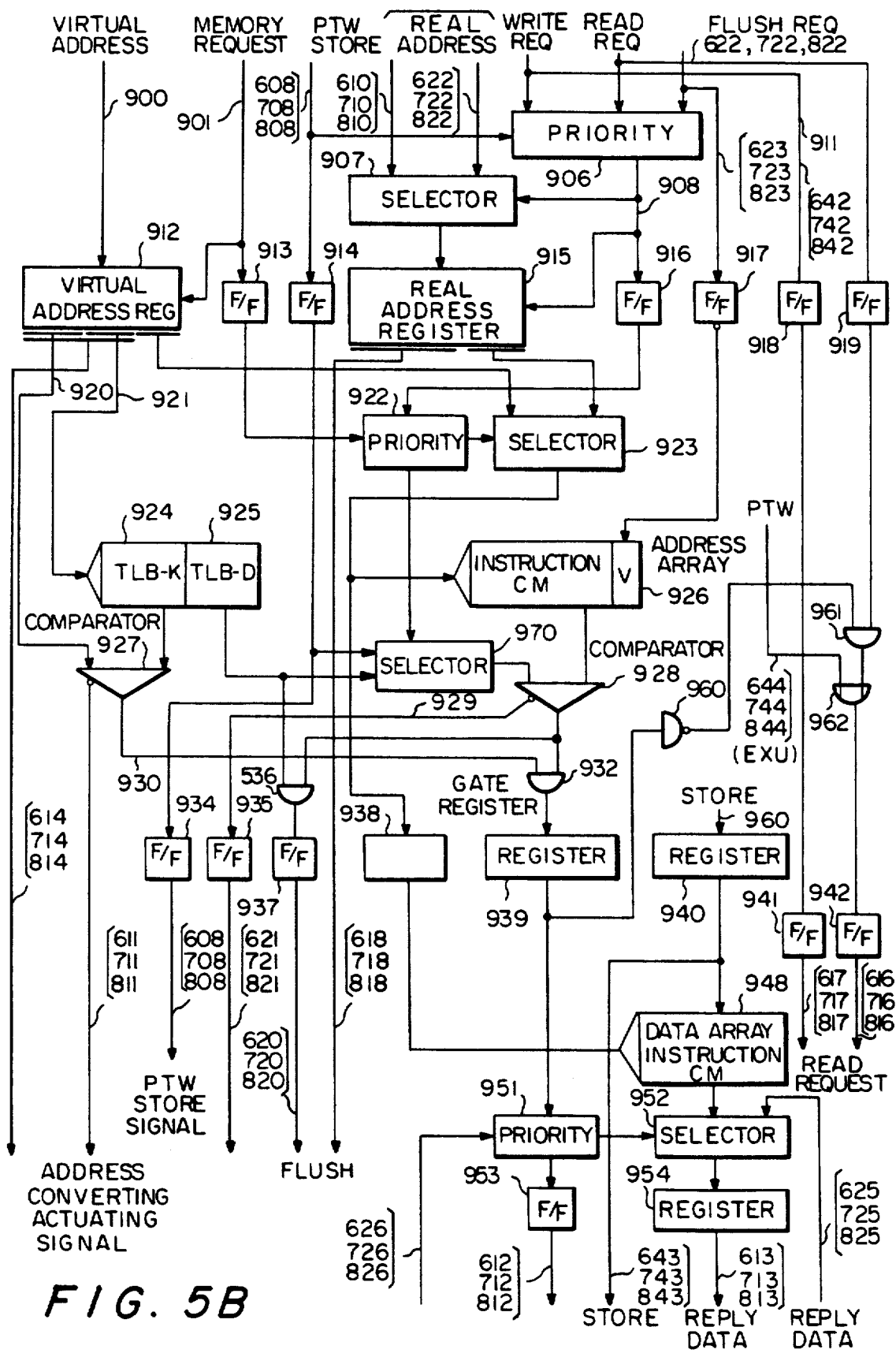
FIG. 5B is a diagram of a detailed structure of an instruction cache control section 103 of the embodiments of FIGS. 1 and 2.

Referring to FIGS. 1 and 5B, in response to a virtual address 900 and a memory request 901 from an external, the CCU 603 looks up a translation lookaside buffer (TLB) and, if no real address corresponding to the virtual address externally given is found, the converting section 102 is actuated by an AC section-actuating signal 611. Thus, the virtual address 900 from the external is stored into a virtual address register 912. Part of the virtual address, 921, stored in the register 912 accesses the TLB 924 and 925. With this access, the TLB's key section 924 outputs a key, which is compared with the rest 920 of the virtual address stored in the register 912 by a comparator 927.

Meanwhile, the request signal 901, after being stored into a flipflop (F/F) 913, is supplied to a priority circuit 922, whose output is fed to a selector 923 to give an instruction to select the rest of the virtual address in the register 912. The rest of the virtual address selected by the selector 923, in response to the instruction, is supplied to an address array 926. In to the remaining part of the virtual address data is output from the address array 926. The data is compared with data from the TLB's data section 925 by a comparator 928. The logical product of a consistency signal resulting from the comparison operation and another consistency signal from the circuit 927 is taken by a gate 932. When the virtual address externally given is in the TLB 924 and 925, the output of a gate 932 is fed to a priority circuit 951 by way of a register 939. The priority circuit 951 then gives an instruction to a selector 952 to select data from a data array 948. With this instruction, data from the array 948 is stored into a register 954 via the selector 957, and returned to the exterior as a reply data 613.

If the virtual address externally given is not stored in the TLB's key section 924, the comparator 927 supplies the actuating signal 611 to the section 102.

Referring now to FIGS. 1 and 4, the AC section 102 actuates a sequence circuit, in response to the signal 611 and refers to a page table in the memory, takes out a page table word (PTW), and generates a real memory address in the PTW. Thus, in the section 102, an F/F 409 of the sequence circuit is set by a virtual address 114 from the CCU 103. At the same time, the virtual address 114 is fed to an arithmetic circuit 408 via a register 405, and a real memory address is generated and stored into a register 416. The output of the F/F 409 sets an f/F 419, whose output is supplied as a read request signal 642 to the CCU 603. In response to the value "1" from a priority circuit 430, the AND gate 444 generates a read request signal 642. Along with that, the output of the F/F 409 is fed to the register 416 via an OR circuit 426, and the register 416 outputs a real memory address 110, which is supplied to the CCU 603. In response to the read request 142 and real memory address 110, the CCU 603 reads data out of the CM or MM 107, and sets them as the reply data 613 in a register 401 of the section 102. Together with the reply data 613, a reply signal 612 is supplied to the section 102 to set an F/F 403 and, at the same time, to reset the F/F 409 via an AND gate 410. In response to the value "1" from the priority circuit 430, a selector 440 selects a reply data 613, and a selector 441 selects a reply signal 612. Simultaneously with the resetting, an F/F 411 is set. With the setting, the result of arithmetic processing of reply data from the register 401 and the contents of the register 405 by the arithmetic circuit 408, i.e., a set instruction signal for setting a PTW address in the register 416, is supplied from the F/F 411 to the register 416 via the OR gate 426. The output of the F/F 411 sets an F/F 414, and the output, as PTW read signal 644, and the PTW real memory address 110 from the register 416 are fed via the CCU 603 to the control section 604 as a block address 618 and read request 616, which are given to the SCU 106. The SCU 106 performs exclusive control of PTW addresses and read request from the processor section 100 and the other processor section 101, and supplies the PTW addresses and read request to the MM 107. PTW's read out of the MM, in response to the PTW addresses and read requests, are stored as the reply data into the register 401 via the SCU 106 and the CCU 603. The reply signal 612, given together with the data 613, sets and F/F 413 via an AND gate 412, and, at the same time, resets the F/F 411. A PTW from the register 401 is converted by a control bit converting circuit 407 and, in response to an output signal from the F/F 413, stored into a register 415. The output signal of the F/F 413 is made a PTW store signal 608 via a F/F 421 and, together with a PTW 124 of the register 415, supplied to the FAA 604 via the CCU 603.

Referring again to FIGS. 1 and 5B, the page table is looked up in the following manner.

The read request signal 642 from the AC section 102 is selected by a priority circuit 506 as instructed by the PTW store signal 608. By a selected signal 908 given from the circuit 906, a selector 907 selects the real memory address 610 from the section 102, and stores it into a real address register 915. The selected signal 908 sets an F/F 916, whose output is fed to a priority circuit 922. The instruction given from the circuit 922 makes a selector 923 select one part of the output of the register 915, and supplies it to the address array 926. The output of the circuit 922 allows a selector 970 to select the other part of the output of the register 915. The selected address and data from the array 926 are compared by the comparator 928. If consistency is recognized here, the contents of the data array 948, i.e., of the CM, are returned as the reply data 613 to the section 102. If consistency fails to be recognized by the comparator 928, the output of a register 939 is set in an F/F 942 via an AND gate 961 and an OR gate 962, because an F/F 919 is set by the read request 642 from the AC section 102. The output of the F/F 942 is fed as the read request 616 to the MM 107 via the access control section 104 and the SCU 106. Data from the MM 107 is returned as reply data 625 and 613 to the section 102 via the SCU 106, the section 104 and the CCU 603.

In reading a PTW, the cache memory is bypassed. Thus, the read address is set in the real address register 915, but the MM 107 is accessed without looking up the address array 926, i.e., the CM. A PTW read 644 from the section 102 is set in the F/F 942 via the OR gate 962 of the CCU 603, and supplied as the read request 616 to the SCU 106 via the MM access control section 104. Since exclusive control is performed in the SCU 106, no PTW read from the other processor section 101 is accepted until the PTW read undergoes PTW store.

By the PTW store signal 608 from the AC section 602, the CCU 603 sends a PTW store signal 615 to the MM access control section 104 and the FAA 605. The PTW 124 from the section 102 is directly sent to the section 104 without going via the CCU 603. The address is sent as the block address 618 to the section 104 from the real address register 915, in which the address at the time of PTW reading is stored. If the PTW were to be stored in a register 940, which is the store buffer of the CCU 603, processing would take a long time when the register 940 was full, and the other processor section 101, awaiting PTW access under exclusive control by the SCU 106, would be unable to achieve memory access all that while. This results in a considerable deterioration in system performance. This embodiment of the invention prevents the deterioration of system performance.

Referring now to FIGS. 1 and 6A, the MM access control section 104 sets the PTW store signal in an F/F 153, and stores the block address 118 into a register 157. By the PTW store signal 115, a priority circuit 150 outputs an instruction signal, in response to which a selector 151 selects a PTW 124, which is stored into a register 158. After that the section 104 sends the SCU 106 data 129, consisting of its own system number 156, address 157 and data 158, and a PTW store signal 150.

Figure 8B:
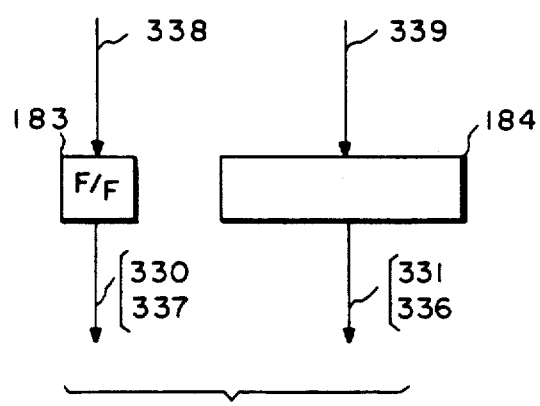

Referring to FIGS. 1, 8A and 8B, in the SCU 106, the PTW store signal 150 from the MM access control section 104 is set in an F/F 183 and, out of the data 129, the system number, address and data are stored into registers 172, 173 and 174, respectively. The output of the F/F 183 is fed to a selector 181 via an OR gate 185, and at the same time to a priority circuit 180, which recognizes the PTW store signal, cancels the exclusive conditions of the PTW reading which took place before the PTW storing, and receives a PTW read signal after the PTW storing. Then a read request, write request, system number, address and data are stored into a register 182, whose output is sent to the MM 107 to complete the PTW storing.

Next will be described in detail the operation of the FAA 605.

Referring to FIGS. 1 and 5B, F/F's 914 and 934 of the CCU 608 are set by the PTW store signal 608 from the AC section 102. The output of the F/F 934 is supplied as the PTW store signal 615 to the MM access control section 104 and the FAA 605. The block address 618 is also supplied from the CCU 603 to the FAA 605.

Figure 9B:
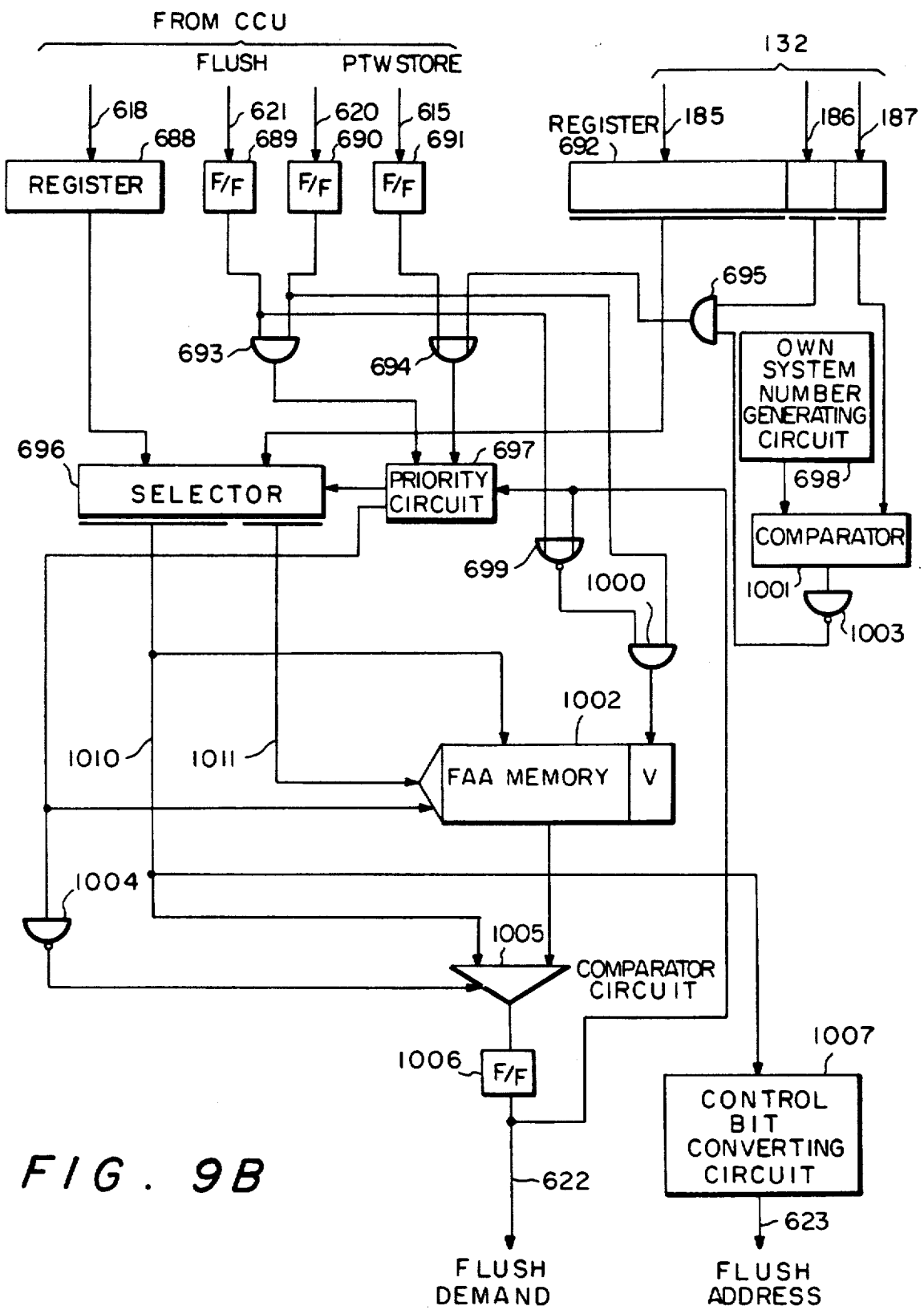
FIG. 9B is a diagram of a detailed structure of the instruction flush array (FAA) 105 of the embodiment of FIG. 1.

Referring now to FIGS. 1 and 9B, the PTW store signal 615 is set in an F/F 691, whose output is fed to a priority circuit 697 via an OR gate 694. With an instruction from the circuit 697, the selector 696 selects the output of a register 688. The circuit 697, in response to the output of the F/F 691, does not supply an enable signal to an FAA memory 1002, but instead activates a comparator 1005 via a NAND gate 1004. An address is output from the FAA 1002 in response to an in-block address 1011 of the register 688, selected by the selector 696. This address and a block address 1010 from the register 688 are compared by the comparator 1005. If consistency is confirmed, an F/F 1006 is set. The output of the F/F 1006, as flush demand signal 622, is sent together with a flush address 623 to the CCU 603.

Referring once again to FIGS. 1 and 5B, the signal 622 from the FAA 605 is set in an F/F 917. The negative output of the F/F 917 varies the V bit of the corresponding block in the address array 526.

Referring back to FIGS. 1 and 9B, the output of the F/F 1006, i.e., the signal 622, is supplied to the FAA memory 1002 via a NOR gate 198 and an AND gate 1000, and varies the V bit of the correspond block.

The flushing operation will be described in detail below. In response to the flush demand signal 622, the priority circuit 697 suspends processing of other requests, and enters a cycle to vary the V bit of the FAA 1002. The circuit 697 gives an instruction to the selector 696 to select the contents of the register 688 in which is stored the address which was stored in the FAA 1002 and could be read out in the preceding cycle. Along with that, the circuit 697 supplies a write-enable signal to the FAA 1002, and also sends a comparison-not-allowed signal to the comparator 1005 via the NAND gate 1004. In this state, the flush demand signal 622 is supplied to the FAA 1002 via a NOR gate 699 and the AND gate 1000 to vary the V bit. This completes the "flushing" operation.

In the first embodiment of the invention, the PTW store signal 608 from the AC section 102 is supplied to the FAA 605 via the CCU 603, so that the PTW storing operation can be reflected on the CM.

Next will be described in detail a second embodiment of the invention.

Referring to FIGS. 1 and 2, the second embodiment of the invention is substantially the same as the first in structure and operation. The only difference is that, while in the first embodiment the PTW store signal 608 from the AC section 102 is supplied to the FAA 605 via the CCU 603, in the second embodiment a PTW store signal 708 from an AC section 202 is directly fed to an FAA memory 705.

Referring to FIG. 10B, the signal 708 from the section 202 is fed to a priority circuit 1113 via an F/F 791. In the priority circuit 1113, in response to the output of the F/F 791, a selector 1114 receives an instruction from the circuit 1113 to select an output of a register 1112. The output of the circuit 1113 enable a priority circuit 697 to give an instruction to a selector 696 to select an output from the selector 1114. The output of the circuit 697 gives an instruction to forbid writing into an FAA memory 1002, and another to a comparator 1005 to compare the output of the FAA 1002 and that of the selector 696. If the result of the comparison by the comparator 1005 indicates consistency, and F/F 1006 is set. The output of the F/F 1006, as a flush demand signal 722, is sent together with a flush address 723 to a CCU 703. The output of the F/F 1006 is supplied to the FAA 1002 via a NOR gate 799 and an AND gate 1000 to vary the V bit.

Next, a third embodiment of the invention will be described in detail.

Referring to FIGS. and 3, the third embodiment of the invention is substantially the same as the first in structure and operation, except that, while in the first embodiment the PTW store signal 608 from the AC section 102 is supplied to the FAA 605 via the CCU 603, in the third embodiment a PTW store signal 808 from an AC section 302 is directly fed to an FAA 805 via a CCU 803, an MM access control section 304 and an SCU 306.

In the third embodiment, the operation is similar to that in the first embodiment until the signal 808 is supplied as a PTW store signal 850 to the SCU 306 via the CCU 803 and the section 304.

Referring now to FIG. 8A, the PTW store signal 350 from the section 304 is supplied via an F/F 183 to a priority circuit 380, which gives an instruction to a selector 181 to select data 329 from a processor section A 300, stored in registers 172, 173 and 174. As a result, the output of the register 172, which is a system number from the processor A 300; that of the register 173, which is a block address; that of the register 174, which is a datum (PTW); that of the PTW store F/F 183; that of a read F/F 170; that of the PTW store F/F 183; that of a read F/F 170; that of a write F/F 171 are stored in a register 182. The PTW store signal, read request signal and write request signal, are sent to an MM 307 as request signals 340. The system number, block address and datum (PTW) are sent to the MM 307 as date 341. Furthermore among the outputs of the register 182, the PTW store signal write request signal, system number and block address are sent as cache consistency ensuring demand signals 332 to all the processors (300 and 301 in FIG. 3).

Figure 11B:
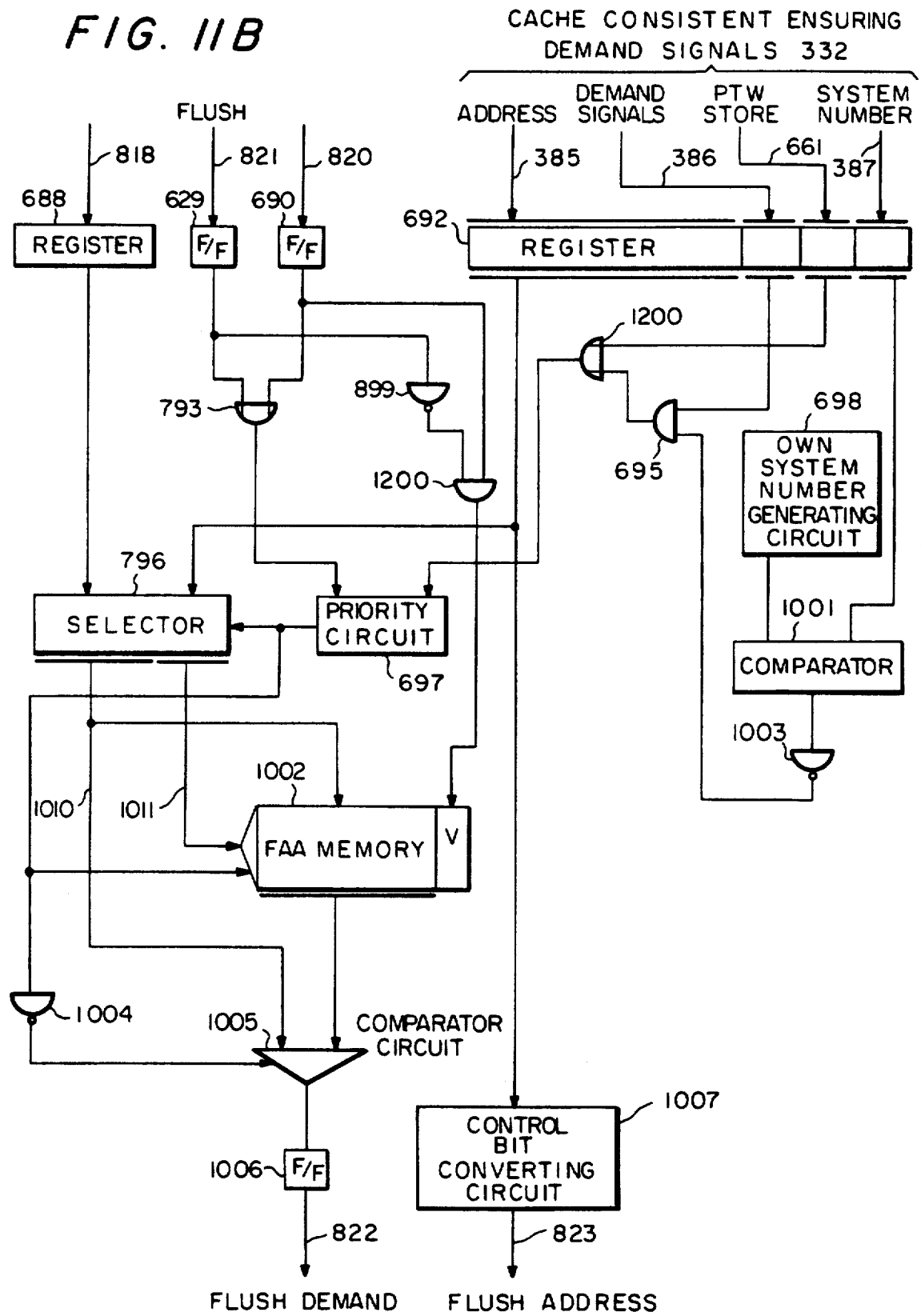
FIG. 11B is a diagram of a detailed structure of the instruction FAA 305 of the embodiment of FIG. 3.

Referring to FIG. 11B, the items of information sent from the SCU 306 as cache consistency ensuring demand signals 332, i.e., an address 385, a cache consistent ensuring demand 386, a PTW store 661 and a system number 387, are stored in a register 192. Consistency between the system number 387, stored in the register 192, and the number generated from an own system number generating circuit 198 is confirmed by a comparator 1001, and a signal is supplied to a priority circuit 697 via an OR gate 650 if the PTW store signal 661 is "1" even though the output of an AND gate 195 is "0". By the output of the OR gate 1200, a selector 769 gives an instruction to a priority circuit 697 to select the address 385 from the register 692. The output of the circuit 697 gives a write forbid instruction to an FAA memory 1002 and at the same time is supplied via a NAND gate 1004 to a comparator 1005, which compares the address 1010 supplied from the selector 196 and an address from the FAA 1002. The consistency confirmed by the comparison is set in an F/F 1006 and, together with a flush address 823, transferred to the CCU 803 as a flush demand signal 822.

Incidentally, in the CM of one embodiment of the invention contents are stored which are a mixture of operands and instructions. Where the invention is used in a system wherein the CM is divided into one for operands and the other for instructions, cache consistency confirmation for stored contents is applied to both operand cache and instruction cache.

According to the present invention, when the address is converted, the PTW is updated, and when it is stored, a PTW store notice signal and the real memory address of the PTW are used to ensure cache consistency among all the processors including the system's own and between the operand and the instruction cache. Hence, even when the software refers to the PTW, the CM can be utilized, resulting in the benefit of raising the processing speed.

What is claimed is:

1. A consistency ensuring system having at least one main memory and a plurality of processors, each of said plurality of processors having a corresponding instruction cache memory and a corresponding operand cache memory wherein each of said plural processors comprises:

flush address array means for keeping a copy of an address array to be looked up and for invalidating a block of data in the corresponding instruction cache memory or the corresponding operand cache memory in response to storing a corresponding block of data into said main memory from a non-corresponding processor;

address converting means for converting a virtual address to a real address and for updating a page table word after address conversion resulting in an updated page table word and storing the updated page table word in said main memory and not in said corresponding instruction cache memory and said corresponding operand cache memory;

signal generating means for generating a page table word store notice signal when said address converting means stores said updated page table word into said main memory; and flush address array invalidating means for looking up and invalidating, in response to said page table word store notice signal and a real memory address of said page table word from said corresponding processor, the corresponding block of data in the corresponding instruction cache memory and the corresponding operand cache memory of said corresponding processor, wherein whenever an instruction is stored in the corresponding instruction cache memory and the main memory, said instruction cannot be stored in the corresponding operand cache memory and, whenever an operand is stored in the corresponding operand cache memory and the main memory, said operand cannot be stored in the corresponding instruction cache memory.

2. A consistency ensuring system, as claimed in claim 1, further comprising main memory access control means for supplying the page table word store notice signal and the real memory address of the page table word to the flush address array.

3. A consistency ensuring system, as claimed in claim 1, further comprising cache control means for supplying the page table word store notice signal and the real memory address of the page table word to the flush address array.

4. A consistency ensuring system, as claimed in claim 1, further comprising means for supplying the page table word store notice signal to the flush address array directly from the address converting means.

* * * * *